United States Patent [19]

Dummermuth

[11] 4,115,853

[45] Sep. 19, 1978

[54] JUMP STRUCTURE FOR A DIGITAL CONTROL SYSTEM

[75] Inventor: Ernst H. Dummermuth, Chesterland, Ohio

[73] Assignee: Allen-Bradley Company, Milwaukee, Wis.

[21] Appl. No.: 752,849

[22] Filed: Dec. 21, 1976

[51] Int. Cl.² .............................................. G06F 9/06
[52] U.S. Cl. .................................................... 364/200
[58] Field of Search ... 364/200 MS File, 900 MS File, 364/104

[56] References Cited

U.S. PATENT DOCUMENTS

| 3,731,280 | 5/1973 | Shevlin | 364/200 |
| 3,969,701 | 7/1976 | Hemdal | 364/200 |
| 3,969,723 | 7/1976 | Kennicott | 364/200 |

*Primary Examiner*—Gareth D. Shaw
*Assistant Examiner*—Thomas M. Heckler
*Attorney, Agent, or Firm*—Quarles & Brady

[57] ABSTRACT

A numerical control system processor is disclosed which stores and executes a control program of the type found in programmable controllers. A number of editing features are provided which allow changes to be made in the control program including insert and delete functions which result in the shifting of control program instructions. A jump table is provided to store memory addresses of jump instruction targets and this table is updated by special instructions within the control program after editing functions are performed. Jump instructions refer to this table when executed to obtain their target memory address.

7 Claims, 5 Drawing Figures

Fig.4a

| MEMORY ADDRESS (OCTAL) | CONTENTS |
|---|---|
| 200 | 7044 |
| 201 | 7074 |
| 202 | 7081 |
| ⋮ | ⋮ |
| 217 | |

| | |
|---|---|
| ⋮ | |
| 7033 | GTO |
| 7034 | 200 |
| ⋮ | |
| 7042 | LBL |
| 7043 | 200 |
| ⋮ | |
| 7053 | GTO |
| 7054 | 201 |
| ⋮ | |
| 7061 | GTO |
| 7062 | 202 |
| ⋮ | |
| 7072 | LBL |
| 7073 | 201 |
| ⋮ | |
| 7077 | LBL |
| 7080 | 202 |
| ⋮ | |

Fig.4b

| MEMORY ADDRESS (OCTAL) | CONTENTS |
|---|---|
| 200 | 7042 |
| 201 | 7072 |
| 202 | 7077 |
| ⋮ | ⋮ |
| 217 | |

| | |
|---|---|
| ⋮ | |
| 7033 | GTO |
| 7034 | 200 |
| ⋮ | |
| 7040 | LBL |
| 7041 | 200 |
| ⋮ | |
| 7051 | GTO |
| 7052 | 201 |
| ⋮ | |
| 7057 | GTO |
| 7060 | 202 |
| ⋮ | |
| 7070 | LBL |
| 7071 | 201 |
| ⋮ | |
| 7075 | LBL |
| 7076 | 202 |
| ⋮ | |

JUMP STRUCTURE FOR A DIGITAL CONTROL SYSTEM

BACKGROUND OF THE INVENTION

The field of the invention is programmable controllers such as those disclosed in U.S. Pat. Nos. 3,810,118 and 3,942,158 and control systems which incorporate programmable controller techniques such as the numerical control systems described in copending U.S. Patent Application Ser. No. 728,000, filed on Sept. 29, 1976 and entitled "Industrial Control Processor System" and U.S. Pat. No. 3,810,104 entitled "Programmable Magnetics for a Numerical Control System".

Programmable controllers such as those described in the above cited patents perform complex control functions in accordance with a series of controller instructions which are continuously and sequentially read from a memory and executed. These controller instructions direct the system to examine the condition of various sensing devices such as limit switches and photoelectric cells, compare these conditions to the conditions specified in the control program, and accordingly, direct the system to energize or deenergize operating devices such as solenoids and motor starters. Programmable controllers are characterized by their distinctive instruction set which facilitates the development of the control program directly from ladder diagrams or Boolean expressions.

A number of procedures and apparatus have been employed to assist the user in developing a control program for a programmable controller. In U.S. Pat. No. 3,813,649 entitled "Controller Program Editor" a program loader suitable for connection with a programmable controller is described which enables the user to enter a control program into the controller memory and allows the user to change, or edit the stored control program. Among these editing features are ones which allow the user to create a gap in the stored control program for the insertion of an additional controller instruction and to close a gap in the stored control program resulting from the deletion, or removal of a controller instruction. These gap and ungap editing functions involve the automatic shifting of portions of the control program within the controller memory, with the result that the memory location of any particular controller instruction may be changed many times during the editing of the control program.

SUMMARY OF THE INVENTION

The present invention relates to a means for implementing "jump" instructions in a system of the type in which the memory address of instructions may be readily changed during development of a control program. More specifically, the present invention includes a jump table which stores the memory address of a target specified by a jump instruction and means responsive to the execution of a special instruction within the control program and associated with the target address for storing the target memory address in the jump table.

A general object of the invention is to provide jump instructions for a controller of the type in which the target addresses may be changed during program editing. The jump table is not effected during editing and all instructions which call for the non-sequential execution of instructions include a target number which addresses a selected line in the jump table to ascertain the desired target memory address. The selected line in the jump table stores the target memory address for that jump instruction and this address is loaded into the program counter each time the jump called for by the instruction is to occur. Associated with each jump instruction is a special controller instruction having the same target number, which when executed, loads its own memory address, or one close to it, into the appropriate line of the jump table. Thus, the memory address of the special instruction is the target memory address and if it is changed during program editing, the subsequent execution of the special instruction will update the jump table with the new target memory address.

Another object of the invention is to automatically alter the target addresses of jump instructions during the execution of editing functions which alter the memory location of controller instructions. Following the creation of a gap or the closing of a gap in the control program the entire control program is scanned before the system is returned to the "run" mode. During this scan the special instructions associated with target addresses are executed to update the jump table with the current memory address of each target. Thus when the system is returned to the run mode, the program will jump to the proper target memory address during the first scan through the control program. It should be apparent that the same result may also be achieved in the run mode by first deactivating all sensing devices and operating devices and then making a preliminary scan through the control program before the system actually begins to control the machine to which it is connected.

The foregoing and other objects and advantages of the invention will appear from the following description. In the description reference is made to the accompanying drawings which form a part hereof, and in which there is shown by way of illustration a preferred embodiment of the invention. Such embodiment does not necessarily represent the full scope of the invention, however, and reference is therefore made to the claims herein for interpreting the scope of the invention.

BRIEF DESCRIPTION OF THE DRAWINGS

FIGS. 4a and 4b are schematic representations of the machine dependent software and the jump table portions of the industrial control processor memory which forms part of the present invention.

DESCRIPTION OF THE PREFERRED EMBODIMENT

Figure 1:
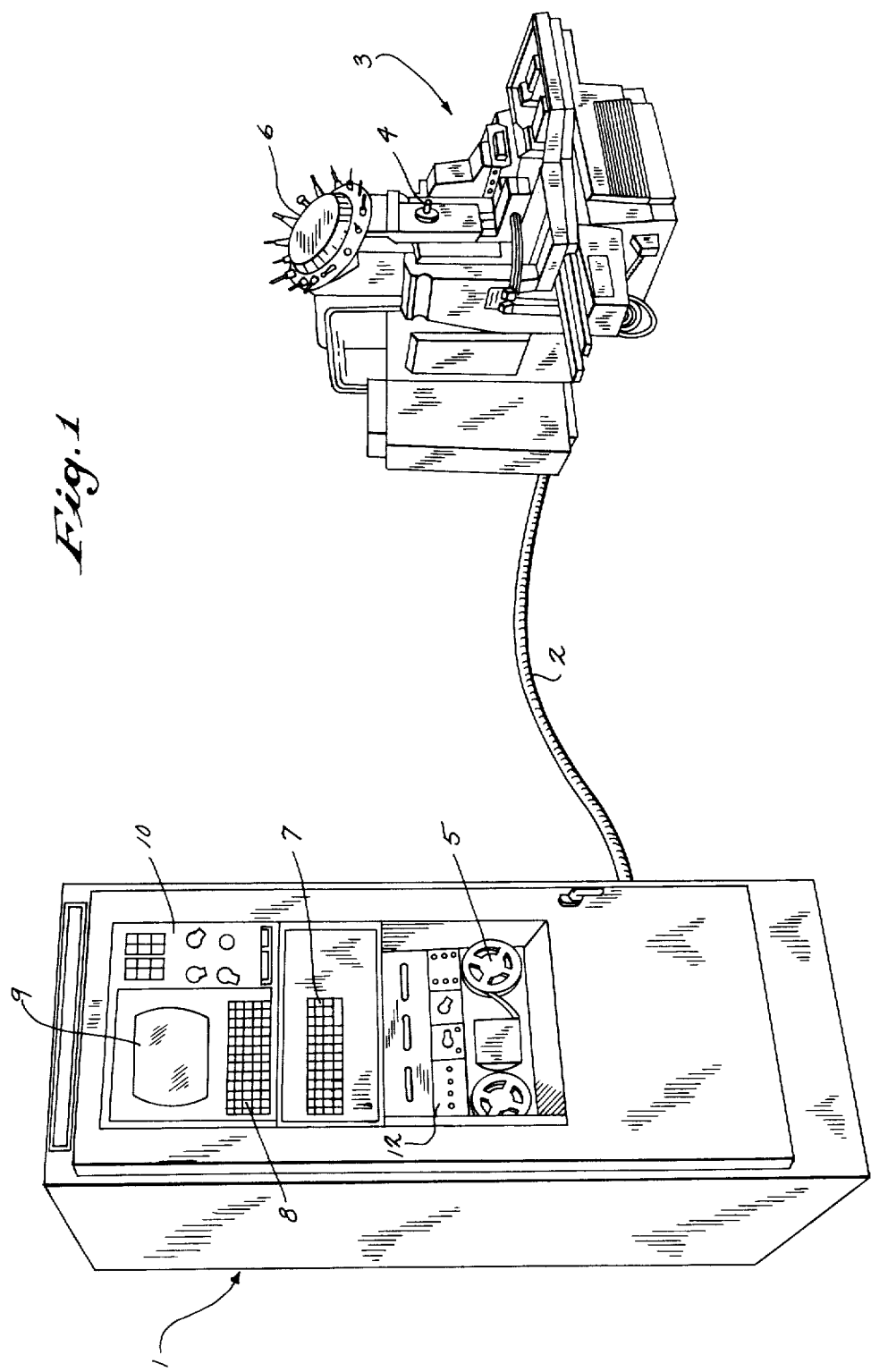
FIG. 1 is a perspective view of a numerical control system connected to a machine tool.

Referring to FIG. 1, a numerical control system is housed in a cabinet 1 and connected through a cable 2 to a multi-function machine tool with automatic tool changer 3. The numerical control system controls the motion of a cutting tool 4 along two or more axes of motion in response to a part program which is read from a tape reader 5. In addition, the numerical control system operates in response to commands read from the tape reader 5 to control auxiliary functions on the machine tool 3, such as automatic tool selection and changing from a tool magazine 6, pallet selection and changing, spindle speed and coolant operation. The implementation of such auxiliary functions involves the sensing of one-bit signals generated by numerous input devices such as limit switches, selector switches, and photoelectric cells, which are mounted to the machine tool 3, and the operation of numerous output devices such as solenoids, lights, relays and motor starters. The numbers and types of such input and output devices, as well as the manner in which they are operated, will vary considerably from machine to machine.

The numerical control system of the present invention will easily interface with machine tools of any make and model. As will be explained in detail hereinafter, this interface is accomplished by programming the numerical control system through an auxiliary keyboard 7 to selectively sense the status of the particular input devices on the machine tool and to selectively operate the output devices thereon to provide the desired manner of operation.

Mounted to the door of the cabinet 1 immediately above the auxiliary keyboard 7 is a manual data input (MDI) keyboard 8 and associated cathode ray tube (CRT) display 9. Mounted to the right of the MDI keyboard 8 and CRT display 9 is a main control panel 10 which includes a variety of pushbuttons and selector switches for providing standard operator controls such as mode selection, feedrate override, spindle speed override, jog select, axis select, etc. One of the pushbuttons enables the keyboards 7 and 8 to enter data.

Figure 2:
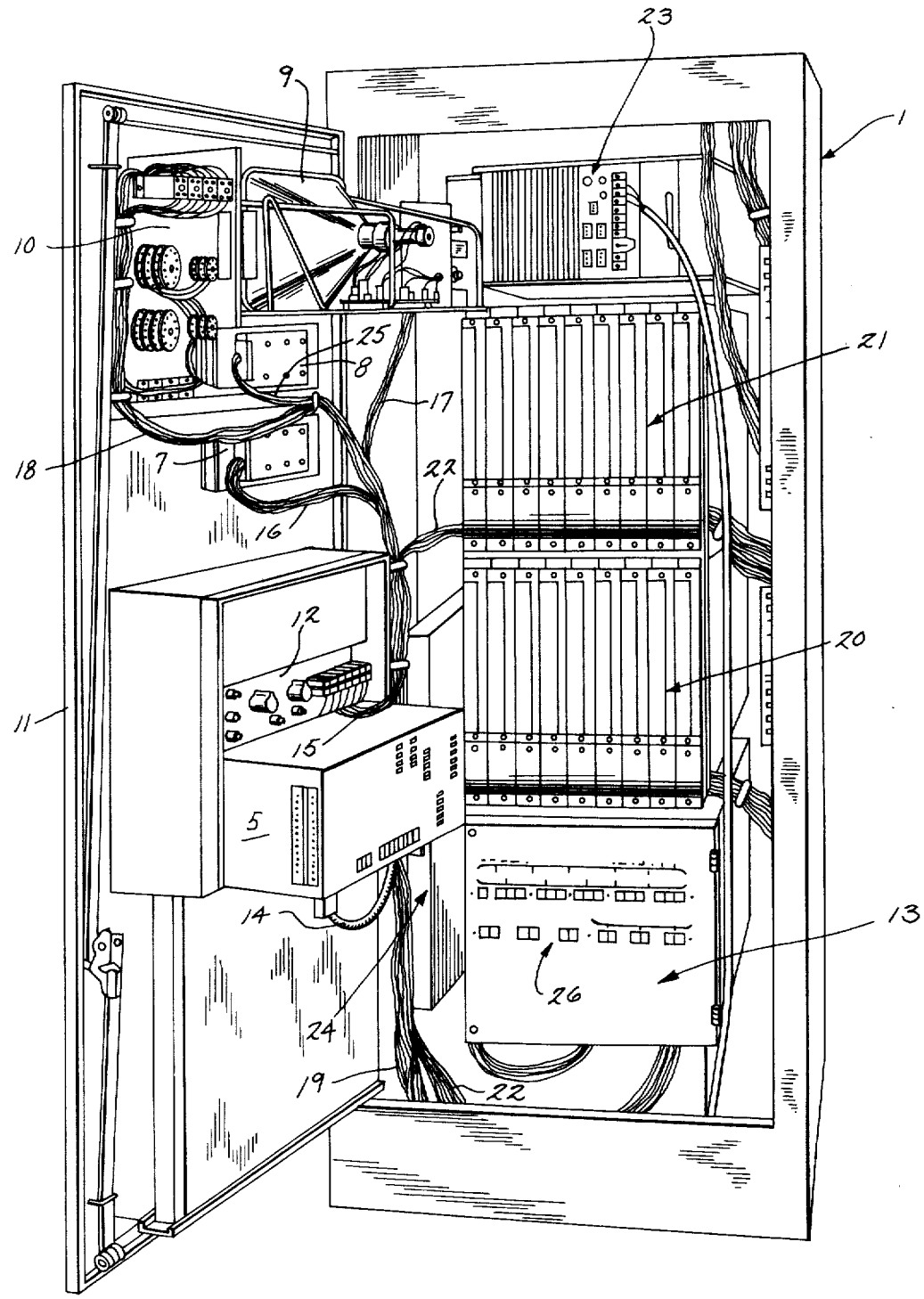
FIG. 2 is a perspective view of the numerical control system of FIG. 1 with the enclosure door open.

Referring particularly to FIG. 2, the elements of the numerical control system are mounted within the cabinet 1 to allow easy access for inspection, testing and maintenance. The keyboards 7 and 8 are mounted to the cabinet door 11 along with the tape reader 5, CRT display 9 and main control panel 10. A secondary control panel 12 mounts immediately above the tape reader 5 and all of these system I/O devices are connected to an industrial control processor 13 which is housed at the bottom of the cabinet 1. More specifically, the tape reader 5 connects through a cable 14, the secondary control panel 12 connects through a cable 15, the auxiliary keyboard 7 connects through a cable 16, the CRT display 9 connects through a cable 17, and the main control panel 10 connects through a cable 18 to a wire harness 19 which leads to the industrial control processor 13. A processor front panel 26 provides a number of manually operable pushbuttons and visual indicators which relate to the operation of the processor 13 and which are connected thereto through a bus (not shown in the drawings).

Two input/output (I/O) interface racks 20 and 21 are mounted in the cabinet 1 above the processor 13 and are connected thereto by a wiring harness 22 which extends upward along their left-hand side. A main power supply 23 mounts above the I/O interface rack 21 and a memory power supply 24 mounts on the left side wall of the cabinet 1.

The I/O interface racks 20 and 21 mount a variety of input circuits and output circuits on closely spaced, vertically disposed printed circuit boards (not shown in the drawings). These input and output circuits serve to couple the industrial control processor 13 with the cable 2 that leads to the machine tool 3 and may include input circuits for sensing the status of limit, selector and pushbutton switches such as that disclosed in U.S. Pat. No. 3,643,115 entitled "Interface Circuit for Industrial Control Systems", and output circuits for driving solenoids and motors such as that disclosed in U.S. Pat. No. 3,745,546 entitled "Controller Output Circuit". The input circuits also include position feedback accumulators which receive feedback data from the position transducers on the machine tool 3 and the output circuits include registers for providing axis motion command words to the machine tool servo mechanism. For a more detailed description of the mechanical aspects of the I/O interface racks 20 and 21, reference is made to copending U.S. Patent Application Ser. No. 562,247 entitled "Disconnect Arm for Electrical Equipment". The single bay cabinet 1 with the two I/O interface racks 20 and 21 will serve a typical three-axis machine tool; however, when a larger system is required, up to five additional I/O interface racks may be mounted in adjacent cabinets to provide additional input/output capacity.

Figure 3:
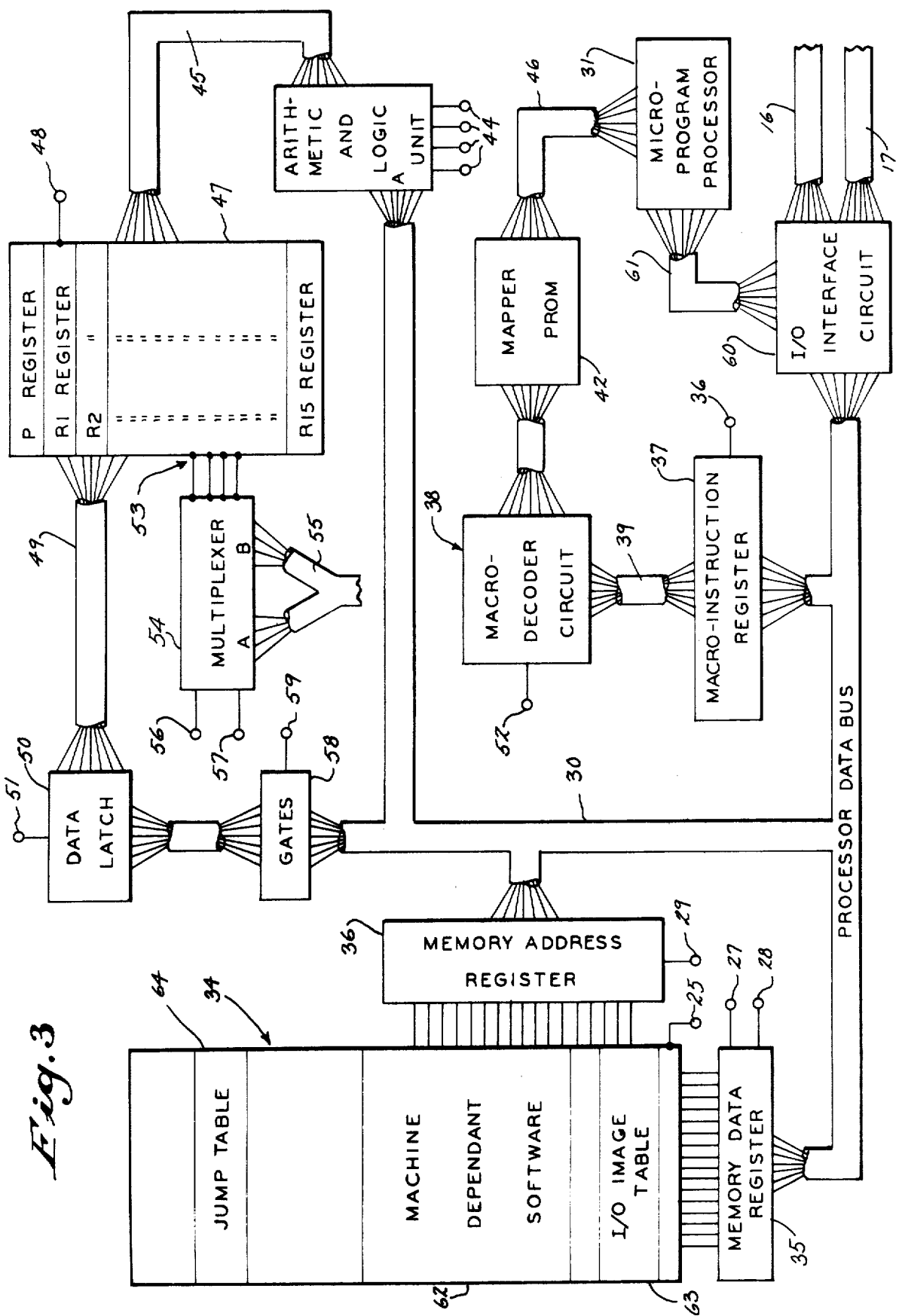
FIG. 3 is an electrical block diagram of an industrial control processor which forms part of the system of FIG. 1 and which embodies the present invention.

Referring particularly to FIG. 3, the industrial control processor 13 is organized around a sixteen-bit bidirectional processor data bus 30. Data is moved from one element of the processor to another through this data bus 30 in response to the execution of micro-instructions by a micro-program processor 31. Each such micro-instruction includes codes, or micro-orders, which indicate the source of the data to be applied to the data bus 30, the destination of the data, and any operations that are to be performed on that data. The micro-program processor 31 stores a large number of micro-programs in a read-only memory (not shown in the drawings) and to enable the processor 13 to perform a desired function, the appropriate micro-routine is selected and executed. This selection is accomplished by sixteen-bit macro-instructions which are stored in a read/write main memory 34.

The main memory 34 is comprised of 4K by 1 dynamic MOS RAMs which are organized to store up to 32,000 sixteen-bit words. Macro-instructions and data are read out of and written into the main memory 34 through a sixteen-bit memory data register 35 which connects to the processor data bus 30. The memory words are selected, or addressed, through a fifteen-bit memory address register 36 which also connects to the processor data bus 30. To write into the main memory 34, an address is first loaded into the memory address register 36 by applying a logic high voltage to its clock lead 29. The data to be loaded appears on the processor data bus 30 and is gated through the memory data register by applying a logic high voltage to its data in clock lead 27. A logic high voltage is then applied to a read/write control line 25 on the memory 34 to complete the loading operation.

Data or a macro-instruction is read out of an addressed line of the main memory 34 when a READ micro-instruction is executed. A logic low voltage is applied to the read/write control line 25 and a logic high voltage is applied to a data out enable line 28 on the memory data register 35. The data word is momentarily stored in the register 35 and is subsequently transferred through the processor data bus 30 to the desired destination.

In response to the execution of a micro-routine called FETCH, which includes the READ micro-instruction, a macro-instruction is read from the main memory 34 and coupled to a sixteen-bit macro-instruction register 37 through the data bus 30. The macro-instruction is stored in the register 37 by a logic high voltage which is applied to a macro-instruction register clock line 36. Certain of the macro-instructions include operation codes which are coupled through an instruction register bus 39 to a macro-decoder circuit 38. The last micro-instruction in the FETCH micro-routine includes a code which is identified by the mnemonic MAP. This micro-instruction code causes the micro-program processor 31 to generate a logic high voltage to the macro-decoder circuit 38 through a MAP line 52 and to thereby initiate decoding of the macro-instruction which is stored in the macro-instruction register 37.

In response to a decoded operation code in a macro-instruction stored in the register 37, one of the stored micro-routines in the micro-program processor 31 is selected. The operation code is applied to the macro-decoder circuit 38 which in turn addresses a selected line in a mapper prom 42. Each line of the mapper prom 42 stores a twelve-bit micro-routine starting address, which when read out, is coupled through a micro-program address bus 46 to preset a twelve-bit micro-sequencer (not shown in the drawings) in the processor 31. The micro-program processor 31 then executes the selected micro-program to carry out the function indicated by the macro-instruction stored in the register 37. mechanisms.

Arithmetic and logic functions are performed on data applied to the processor data bus 30 by an arithmetic and logic unit (ALU) 43. The ALU 43 is comprised of four commercially available full carry look-ahead circuits to perform high speed functions such as add, subtract, decrement and straight transfer. The ALU 43 has a set of sixteen "A" inputs which connect directly to the leads in the processor data bus 30 and a set of four function-select lines 44 which connect to the micro-program processor 31. In response to selected micro-instructions, the ALU 43 performs functions on data applied to its A inputs and generates the sixteen-bit results on an ALU data bus 45.

Connected to the ALU data bus 45 is a random access memory 47. The random access memory 47 is comprised of four commercially available 64-bit (16×4) random access memories which are arranged to provide sixteen sixteen-bit registers identified hereinafter as the "P" register and the R1-R15 registers. A sixteen-bit data word is written into the random access memory 47 from the ALU data bus 45 when a logic high voltage is applied to a read-write line 48. On the other hand, the contents of one of the sixteen registers in the memory 47 is read out through a bus 49 to a sixteen-bit data latch 50 when the line 48 is at a logic low voltage and the data latch 50 stores this word when a logic high voltage is applied to its clock line 51. The lines 48 and 51 connect to the micro-program processor 31 and both the random access memory 47 and the data latch 50 are thus responsive to selected micro-instructions.

The particular register in the random access memory 47 to be accessed is determined by a four-bit address code which is applied to a set of terminals 53. The address terminals 53 are connected to the outputs of a four-bit multiplexer 54 which has a set of "A" inputs connected to receive bits 4-7 (source field) of the micro-instruction being executed and a set of four "B" inputs which are connected to receive bits 9-12 (destination field) of the micro-instruction being executed through a micro-instruction bus 55 which connects to the micro-program processor 31. The multiplexer 54 is enabled through a lead 56 which connects to the micro-program processor 31 and the four-bit address on the A or B inputs is selected by the logic signal applied to a lead 57 which connects to receive a 5 mhz. "destination" signal from a clock circuit. As will become more apparent from the description to follow, when the random access memory 47 is identified as the source of data, the address of the particular register in the memory 47 from which the data is to be read appears at the A inputs of the multiplexer 54, and when the random access memory 47 is identified as the destination of data, the address of the particular register into which the data is to be written appears on the B inputs.

Data read from the random access memory 47 and stored in the data latch 50 is coupled to the processor data bus 30 by a set of sixteen gates 58. The gates 58 are enabled through a lead 59 which connects to, and is controlled by, the micro-program processor 31. For example, the P register in the memory 47 serves as the macro-program counter, and when the FETCH micro-routine is executed, the contents of the P register is read out through the data latch 50 and the gates 58 to the processor data bus 30 where it is coupled to the main memory address register 36.

Data is coupled between the main memory 34 and the system I/O devices by an interface circuit 60. The operation of the I/O interface circuit 60 is controlled by the micro-program processor 31 through a cable 61. In response to selected micro-instructions the circuit 60 couples data from a selected I/O device such as the auxiliary keyboard 7 to the processor data bus 30, and in response to other selected micro-instructions, it couples data from the processor data bus 30 to selected I/O devices such as the CRT display 9.

For a more detailed description of the processor 13 and the manner in which it operates, reference is made to the above cited copending patent application entitled "Industrial Control Processor System".

The above described hardware is operated in response to micro-routines comprised of micro-instructions which are executed at a rate of one every 200 nanoseconds. These micro-instructions include codes which are decoded to generate enabling signals to the appropriate system elements. The operation of the hardware will become more apparent after the micro-instruction set which this hardware executes is discussed.

The micro-instruction set is comprised of three types of instructions, only the first of which is pertinent to the present invention. The first type of micro-instruction has the following format and is employed to transfer data between processor elements which couple to the processor data bus 30, to perform logical and arithmetic functions on data applied to the ALU 43, and to perform data test and micro-instruction skip operations.

| Bit No. | 23 22 21 20 19 | 18 17 16 15 14 | 13 12 11 10 9 | 8 7 6 5 4 | 3 2 1 0 |
|---|---|---|---|---|---|
| Description | PROCESSOR FUNCTION | ALU FUNCTION | DESTINATION FIELD | SOURCE FIELD | SKIP,FLAG and MAP |

The micro-program processor 31 simultaneously decodes each of the five "micro-orders" in this first type of micro-instruction and enables the appropriate processor elements to perform one or more functions. The processor element identified by the destination code is not enabled, however, until the last 50 nanosecond portion of the 200 nanosecond execution time period. The codes pertinent to the present invention which may be employed in the five micro-orders of a "type one" micro-instruction are as follows:

| PROCESSOR FUNCTION MICRO-ORDER CODES | | |
|---|---|---|
| Mnemonic | Bit Pattern | Description |
| NOP | 00000 or 11111 | No operation is performed. |
| READ | 01000 | Loads address into main memory address register 36 and reads out data or macro-instruction into memory data register 35. |
| WRTE | 01001 | Loads address into main memory address register 36 and writes contents of memory data register 35 into main memory 34. |

| ALU FUNCTION MICRO-ORDER CODES | | |
|---|---|---|
| Mnemonic | Bit Pattern | Description |
| INC | 00010 | Increment data on processor data bus 30 by one count. |
| PASS | 00000 | Passes the data to the ALU bus 45 unchanged. |

| DESTINATION FIELD MICRO-ORDER CODES | | |
|---|---|---|
| Mnemonic | Bit Pattern | Description |
| ABT | 10110 | A register or B register (not shown in the drawings) or memory 34 depending on contents of memory address register 36. |
| IR | 11011 | Stores data on processor data bus 30 in macro-instruction register 37. |
| NOP | 11111 | No store operation. |
| P | 00000 | Store data on ALU bus 45 in the P register of memory 47. |
| T | 10010 | Store data on processor data bus 30 in the memory data register 35. |
| R1– R15 | 00001 through 01111 | Store data on ALU bus 45 in one of the respective registers R1 through R15 of the memory 47. |

| SOURCE FIELD MICRO-ORDER CODES | | |
|---|---|---|
| Mnemonic | Bit Pattern | Description |
| ABT | 10110 | A register, B register or memory 34 depending on contents of memory address register 36. |
| IR | 11011 | Couples data in macro-instruction register 37 to the processor data bus 30. |
| NOP | 11111 | Processor data bus 30 contains all ones. |
| P | 00000 | Couples contents of P register in memory 47 to the processor data bus 30. |
| R1– R15 | 00001 through 01111 | Couples data from respective registers R1 through R15 in the memory 47 to the processor data bus 30. |
| T | 10010 | Couples main memory data from register 35 to the processor data bus 30. |

| MAPPING MICRO-ORDER CODES | | |
|---|---|---|
| Mnemonic | Bit Pattern | Description |
| EOX | 1100 | Indicates that micro-routine is complete after execution of next micro-instruction and enables priority mapper prom 42. |
| EOXS | 1101 | Indicates that micro-routine is complete and enables priority mapper prom 42. |
| MAP | 1111 | Enables macro-decoder circuit 38 to call up micro-routine specified by macro-instruction in register 37. |

The above defined micro-instructions are combined with others to form micro-routines which are employed to execute macro-instructions. The macro-instructions are stored in the main memory 34 and are combined to form programs, or routines, which when executed, perform the various numerical control functions and operate the discrete digital devices associated with the machine tool.

In addition to programs related to the numerical control functions and programs for servicing of the system I/O devices such as the keyboards 7 and 8 and the CRT display 9, the main read/write memory 34 stores machine dependent software 62. The machine dependent software is comprised of programmable controller type instructions which are periodically executed to examine the status of sensing devices on the machine tool 3 and to set the state of operating devices on the machine tool 3. Rather than communicating directly with the sensing devices and operating devices on the machine tool 3, however, an I/O image table 63 is stored in the memory 34 which contains an image of the status of all operating and sensing devices on the machine tool 3. The I/O image table 63 is periodically updated by coupling status data from all sensing devices and writing it into selected memory locations in the I/O image table 63, and by periodically updating the state of all operating devices on the machine tool 3 by reading status data out of selected memory locations in the I/O image table 63. To examine the state of a particular sensing device in response to a controller instruction in the machine dependent software 62, therefore, the processor 13 examines the status of the memory location in the I/O image table 63 which corresponds to it. Similarly, the state of an operating device is set by a controller instruction which writes the desired state into the I/O image table memory location which corresponds to that operating device. Every 10.24 milliseconds, the I/O image table 63 is updated by a timed interrupt routine which reads the operating device status data out of the memory 34 and through the I/O interface circuit 60 to control the appropriate devices on the machine tool 3.

As with conventional programmable controllers, the controller instructions in the machine dependent software 62 execute Boolean equations to determine whether a particular operating device should be energized or deenergized. The controller instruction set includes thirty-three operating instructions which may be employed in the machine dependent software 62 and nine editing instructions which may be employed to edit the machine dependent software 62. The operating instructions may be divided into the five following categories: basic, timer, counter, arithmetic and special. The basic instructions are those required to execute, or solve, Boolean equations. In the following list of such instructions the "display and keyboard symbol" which is indicated for each, appears on a key of the auxiliary keyboard 7 and it appears on the screen of the CRT display 9 when that key is depressed.

| | | Basic Instructions | |
|---|---|---|---|
| Mnemonic | Display & Keyboard Symbol | Operation Code (Octal) | Description |
| XIC | –] [– | 10516 | Examine status bit closed or, is the status bit in a logic 1 state? |
| XIO | –]/[– | 10520 | Examine status bit open or, is the status bit in a logic 0 state? |

-continued

| Mnemonic | Display & Keyboard Symbol | Operation Code (Octal) | Description |
|---|---|---|---|
| BND | ⊐⌐ | 10524 | Branch end; termination of a Boolean subbranch. |
| BST | ⌐⊐ | 10522 | Branch start; opens, or begins a Boolean subbranch. |
| OTE | —( )— | 10530 | If conditions are true turn status bit on and if conditions are false turn status bit off. |
| OTD | —(/)— | 10526 | If conditions are true turn status bit off and if conditions are false turn status bit on. |
| OTL | —(L)— | 10554 | If conditions are true turn status bit on and if false, do nothing. |
| OTU | —(U)— | 10534 | If conditions are true turn status bit off and if false, do nothing. |
| GET | —[G]— | 10532 | Get word stored on the selected memory line and store in A register. |
| EQL | —[=]— | 10540 | Is the value stored in A register equal to the value stored on the selected memory line? |
| LES | —[<]— | 10542 | Is the value stored in A register less than the value stored on the selected memory line? |
| PUT | —(PUT)— | 10544 | If conditions are true write the word stored in A register into the selected memory line; if false, do nothing. |

TIMER INSTRUCTIONS

| Mnemonic | Display & Keyboard Symbol | Operation Code (Octal) | Description |
|---|---|---|---|
| TON 0.1 | —(TON)— | 105143 | If conditions are true wait until time is out then turn output on, otherwise, turn output off. |
| TON 1.0 | —(TON)— | 105144 | Same as TON 0.1 except longer timing interval possible. |
| TOF 0.1 | —(TOF)— | 105145 | If conditions are true turn output on, otherwise, wait until time is out then turn output off. |
| TOF 1.0 | —(TOF)— | 105146 | Same as TOF 0.1 except longer timing interval possible. |
| RTO 0.1 | —(RTO)— | 105147 | If conditions are true wait until time is out then turn output on, otherwise, stop timer. |
| RTO 1.0 | —(RTO)— | 105150 | Same as RTO 0.1 except longer timing interval possible. |
| RTR | —(RTR)— | 105151 | If the conditions are true reset the timer. |

COUNTER INSTRUCTIONS

| Mnemonic | Display & Keyboard Symbol | Operation Code (Octal) | Description |
|---|---|---|---|
| CTU | —(CTU)— | 105140 | If conditions are true increase the count by one. |
| CTD | —(CTD)— | 105141 | If conditions are true decrease the count by one. |
| CTR | —(CTR)— | 105142 | If conditions are true reset the counter to zero. |

Arithmetic Instructions

| Mnemonic | Display & Keyboard Symbol | Operation Code (Octal) | Description |
|---|---|---|---|
| PLUS | —[+]— | 105500 | Add contents of A register with data from addressed line of memory 34 and store result in A register. |
| MINUS | —[−]— | 105520 | Subtract data on addressed line of memory 34 from contents of A register and store result in A register. |

SPECIAL INSTRUCTIONS

| Mnemonic | Display & Keyboard Symbol | Operation Code (Octal) | Description |
|---|---|---|---|
| TBL | —[TBL]— | 105153 | Read a line from user data table into the A register. |
| B/D | —[B—D]— | 105154 | Binary to decimal conversion. |
| D/B | —[D—B]— | 105155 | Decimal to binary conversion. |
| SLR | —[S>]— | 10146 | Shift contents of A register right a specified amount. |
| SLL | —[S<]— | 10546 | Shift contents of A register left a specified amount. |
| OUTP | | 105157 | Couple contents of I/O image table to one I/O interface rack. |
| INPT | | 105156 | Couple data from one I/O interface rack to associated memory locations to I/O image table. |

| | -continued | | |
|---|---|---|---|
| GTO | —(GTO)— | 105152 | If conditions are true load memory address of target indicated by operand into program counter (P). |
| LBL | —[LBL]— | 105360 | Load contents of program counter (P) into jump table address indicated by operand. |

The editing instructions are employed to develop the machine dependent software using the keyboard 7 and the CRT display 9. These instructions call up subroutines which execute functions defined as follows:

| Mnemonic | Keyboard Symbol | Operation Code (Octal) | Description |
|---|---|---|---|
| | INSERT | | An opening is formed in the machine dependent software for the insertion of an additional programmable controller type macro-instruction. |
| | DELETE | | A programmable controller type macro-instruction is removed from the machine dependent software routine and the resulting gap is closed. |
| | RUNG | | Specifies the ladder diagram rung to be displayed on CRT 9 and edited with keyboard 7. |
| | ↓ | | Decrements rung cursor to display and edit previous rung. |
| | ↑ | | Increments rung cursor to display and edit next rung. |
| | → | | Moves element cursor to the right to load or edit next rung element. |
| | ← | | Moves element cursor to the left to edit previous rung element. |
| | CANCEL | | Cancels searches and numeric input. |
| | SEARCH | | Displays on CRT screen a selected programmable controller type macro-instruction in the machine dependent software routine. |

The auxiliary keyboard 7 is employed along with a program editor routine to load the machine dependent software 62 into the memory 34. The controller instructions are stored in the order in which they are to be executed and each is entered by depressing the appropriate keys on the keyboard 7. Due to the length of the machine dependent software 62 it is desirable not to leave any empty memory lines. Accordingly, the above defined "insert" and "delete" editing functions may be employed to create a space in the machine dependent software 62 into which a new instruction may be inserted or to close a space formed by the deletion of an instruction. As described in the above cited U.S. Pat. No. 3,813,649, these editing functions involve the shifting of every controller instruction in the memory which is located to one side of the specified memory location. For example, if a gap is to be created for the insertion of a new controller instruction at memory address 7046 (octal), the system starts with the last controller instruction (END) and sequentially shifts those between it and memory location 7046 (octal) to a higher memory address. Each such instruction is read out of the memory 34 and rewritten into it at another memory location. A vacancy is thus created at memory addresses 7046 and 7047 (octal) and a new double word instruction may be written into it. Similarly, when a controller instruction is deleted the resulting gap in the program is closed by shifting each controller instruction thereafter to a lower memory address. More specifically, commencing with the controller instruction after the one to be deleted, each is read out of the memory 34 and rewritten back into it at a lower memory address until the last controller instruction (END) has been shifted. Although as described in U.S. Pat. No. 3,813,649, these editing functions may be carried out by special purpose hardware, in the embodiment described herein, these two editing functions are performed by the above described hardware in combination with programs which are executed when the "insert" and "delete" keys are depressed on the auxiliary keyboard 7. Also, in contrast to the system described in U.S. Pat. No. 3,813,649 the controller instructions in the present embodiment occupy two memory lines rather than one, and a gap is created or closed by shifting controller instructions two memory lines.

The "insert" and "delete" editing functions are not part of the present invention, but they do create the situation that gives rise to the need for the present invention; that is, they shift the memory location of a portion of the machine dependent software 62. Other editing functions or procedures which result in the changing of controller instruction memory locations may present the same situation.

The present invention relates particularly to the GTO and LBL controller instructions which are listed above. The GTO instruction is a conditional jump which directs the processor 13 to execute the machine dependent software 62 out of its sequential order when the conditions specified in previous controller instructions have been met. The GTO instruction (or any other conditional or unconditional jump type instruction) must identify the target memory address to which the system is to jump. It should be apparent, however, that if the target memory address is specified directly in the GTO instruction, it must be changed each time an editing function is performed which involves the shifting of controller instruction memory addresses. In other words, the editing functions such as "insert" or "delete" may change the memory address of the point, or target, in the control program to which the system is to jump thus necessitating the changing of the GTO instruction. Therefore, the target memory address of each GTO instruction is indirectly identified by a target number which accompanies the operation code and which refers to a particular location in a jump table 64. The jump table 64 is then employed to obtain the desired target memory address.

Referring particularly to FIGS. 3, the jump table 64 is stored in the read/write main memory 34 at memory locations 200-217 (octal). Each of the memory locations in the table 64 is separately selectable, or addressable, by a target number which corresponds to its memory address. A target memory address may be stored on each such location. The table 64 is not part of the machine dependent software 62 in the sense that it cannot be directly modified by the user and its memory location is fixed. Editing functions such as "insert" and "delete" will not, therefore, shift or otherwise change the memory addresses of the jump table contents. One jump table location is required for each jump type controller instruction and the size of the jump table 64 is, therefore, dictated by the number of such jump instructions used in the machine dependent software 62.

Referring particularly to FIG. 4a, GTO instructions typically appear throughout the machine dependent software 62. Each is comprised of two lines, the first line storing the GTO operation code and the second line storing the three octal digit jump target number. Each target number is associated with a location in the jump table 64 and when the GTO instruction is executed, the jump target number is employed to read out the contents of its associated jump table location. The contents of that jump table location is the target memory address of the GTO instruction and it is this address which is loaded into the processor program counter (P register in the read/write memory 47). It should be apparent, therefore, that if the target memory address is changed due to the execution of an editing function, the GTO instruction need not be altered, but rather, the contents of the jump table 64 is changed. The micro-routine which is executed in response to the GTO operation code is as follows:

| Label | Processor Function | ALU Function | Destination Field | Source Field | Skip/ Map |
|---|---|---|---|---|---|
| GTO | READ | INC | P | P | |
| | | PASS | | R12 | AL15 |
| | | ONES | R12 | | EOXS |
| | READ | PASS | | T | |
| | | ONES | R12 | | |
| | | PASS | P | T | EOXS |

The first micro-instruction reads the target which follows the GTO operation code out of the memory 34 and stores it in the memory data register 35 (T). It also increments the program counter (P). The second micro-instruction tests register R12 to determine whether conditions are proper for the jump to occur, and if so, the next micro-instruction is skipped. If not, the next micro-instruction sets register R12 to one and terminates the micro-routine. The fourth micro-instruction reads the contents of the jump table 64 indicated by the target number in the memory data register 35 (T) and stores it in the register 35 (T). The next micro-instruction sets register R12 to one and the final micro-instruction transfers the target address in the register 35 (T) to the program counter P. The jump is thus completed.

An LBL instruction is associated with each GTO instruction and it serves as a special instruction which loads the target memory address into the jump table 64. Each LBL instruction is comprised of an operation code which selects the appropriate micro-routine and a three-octal digit jump target number which is identical to that of its associated GTO instruction. When the LBL instruction is executed, its jump target number is employed to address the corresponding line in the jump table 64 and the contents of the program counter (P register in the read/write memory 47) is written into that line. In other words, the memory address of the LBL instruction, or in the preferred embodiment the one following, is stored in the jump table 64. As a result, when a GTO instruction is executed during a subsequent scan of the control program, the system jumps to the memory address of its associated LBL instruction. If the LBL instruction is shifted, the target address in the jump table 64 is changed accordingly. The micro-routine which is executed in response to the LBL operation code is as follows:

| Label | Processor Function | ALU Function | Destination Field | Source Field | Skip/ Map |
|---|---|---|---|---|---|
| LBL | READ | INC | P | P | |
| | | PASS | | | |
| | WRTE | PASS | | T | |
| | | PASS | T | P | EOXS |

The first micro-instruction reads the target number which follows the LBL operation code out of the memory 34 and stores it in the memory data register 35 (T). The program counter (P) is also incremented. The third micro-instruction allows time for this to occur and the fourth and fifth micro-instructions perform a write function in which the target number in the memory data register 35 is loaded into the memory address register 36, the contents of the program counter (P) is loaded into the memory data register 35 (T) and then written into the jump table 64. The micro-routine is thus completed, and the next micro-instruction following the LBL instruction is then executed:

The examples of FIGS. 4a and 4b illustrate what occurs when the controller instructions commencing with, or immediately above the LBL instruction at memory address 7042 (octal) are shifted upward. Such a shift might occur, for example, if a controller instruction at memory locations 7036 and 7037 (octal) is deleted during editing. Immediately after the editing function is completed, and preferably as an integral part thereof, the machine dependent software 62 is sequentially scanned. During this scan the system is in the editing mode and no operating devices are controlled; however, the LBL instructions are all executed to write in their new memory addresses into the jump table 64. Thus, when the system is switched to the run mode and the machine dependent software 62 is executed during the 10.24 millisecond timed interrupt routine, the target memory addresses of the GTO instructions have been properly and automatically altered to account for the program editing which has occured.

It should be apparent that many variations can be made in the above described preferred embodiment of the invention without departing from the spirit of the invention. First, the invention may be applied to programmable controllers which have either an integral or separate program panel which performs the editing functions. The invention may also be applied to a program loader, or panel, such as that disclosed in U.S. Pat. No. 3,798,612 in which the control program is developed and edited in a read/write memory and is then transferred to a read-only memory for use in a programmable controller.

The jump table may be a separate storage device or it may be located in the same memory device as the control program. Also, the memory addresses stored in the jump table may point to the memory location of their associated LBL instructions or, as in the preferred embodiment, to the instruction which follows. Also, although the scanning of the control program following an editing function is necessary to update the jump table with any changed target memory address, such scanning may be performed as part of the transition from editing mode to run mode. Such updating may also be made a manually initiated function by providing a suitably labelled key and an associated routine or hardwired circuit.

Finally, the three-octal digit target number which accompanies the GTO operation code may be identical to the memory address of its corresponding line in the jump table as described above, or it may be transformed in some manner. For example, the sixteen lines of the jump table 64 may be indicated by octal numbers 0-17 in the GTO instructions and when such an instruction is executed, the constant 200 (octal) is added to the target number to obtain the actual memory address of the appropriate line in the jump table 64. This is easily accomplished when the target number is coupled through the ALU 43 to the program counter in the memory 47.

I claim:

1. In a digital system, the combination comprising:
   memory means for storing at successive memory addresses a set of control instructions;
   memory address means coupled to said memory means and being operable to selectively address one of said control instructions;
   jump table storage means for storing a plurality of selectable target memory addresses, each at a separate storage location;
   first means coupled to said memory means for reading addressed control instructions from said memory means;
   second means coupled to said first means and said jump table storage means for selecting one of said stored target memory addresses in response to a selected code in one of said control instructions;
   third means coupled to said jump table storage means and said memory address means for loading a selected target memory address into said memory address means; and
   fourth means coupled to said memory means, said memory address means and said jump table storage means and being operable in response to another selected code in another selected one of said control instructions read from said memory means to load a memory address from said memory address means into a selected location in said jump table storage means.

2. The digital system as recited in claim 1 in which each of the control instructions having said one selected code includes a target number and each of the control instructions having said other selected code includes a target number and wherein each of said control instructions having said one selected code is associated with one of said control instructions having said other selected code, said associated control instructions having the same target number.

3. The digital system as recited in claim 2 in which said fourth means is responsive to the target number in said other selected control instructions to select the jump table storage location and said second means is responsive to the target number in said one control instruction to select the target memory address in the jump table storage means.

4. The digital system as recited in claim 1 in which said jump table storage means and said memory means each form part of a read/write memory and said memory address means includes a program counter and a memory address register.

5. In a digital control system having a memory which stores at memory locations a control program comprised of controller instructions which are periodically and sequentially read from the memory and executed by a processor to control the operation of a machine connected to the digital control system, the combination comprising:
   a jump table storage having a plurality of separately addressable locations into each of which a target address may be written and stored and from each of which a stored target address may be read; a target designation means coupled to said processor and coupled to said jump table storage, said target designation means being responsive to a code in label instructions which form part of said control program to couple the memory location address of each such label instruction to a jump table storage location which is selected by a target number contained in the label instruction; and
   jump means coupled to said processor and coupled to said jump table storage, said jump means being responsive to a code in jump instructions which form part of said control program to read a target address out of a selected location in said jump table storage and couple it to said processor to alter the sequence in which said control program is read and executed, the location in said jump table storage being selected by a target number contained in each jump instruction.

6. The digital control system as recited in claim 5 in which each of said jump instructions is associated with one of said label instructions by means of the same target number.

7. The digital control system as recited in claim 5 in which said processor includes a program counter which is coupled to said memory for addressing selected locations therein and which is coupled to said jump table storage to receive target addresses read therefrom, said program counter being operable to address memory locations indicated by received target addresses.

* * * * *